N. S. McFARLAND.
Coffee-Pot.
No. 161,254. Patented March 23, 1875.
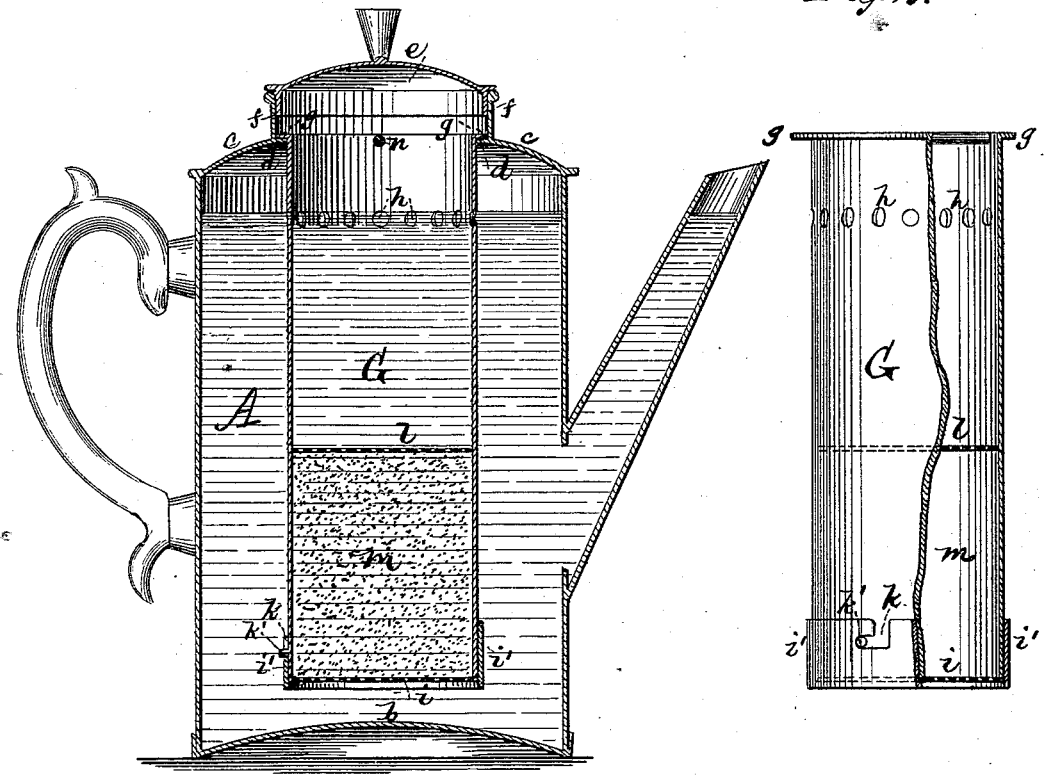

UNITED STATES PATENT OFFICE.

NATHANIEL S. McFARLAND, OF NEW YORK, N. Y.

IMPROVEMENT IN COFFEE-POTS.

Specification forming part of Letters Patent No. 161,254, dated March 23, 1875; application filed February 18, 1875.

*To all whom it may concern:*

Be it known that I, NATHANIEL S. MCFARLAND, of New York, in the county and State of New York, have invented certain Improvements in Coffee-Pots; and I do hereby declare that the following is a full, clear, and exact description thereof, reference being had to the accompanying drawing, making part of this specification.

My invention consists in the combination, with a coffee-pot, of a coffee-receptacle and strainer of novel construction, whereby the ground coffee is thoroughly infused, and may then be removed from the coffee-pot, leaving the liquid coffee therein ready for use.

In the accompanying drawing, Figure 1 is a central vertical section of a coffee-pot embodying my invention. Fig. 2 is a side view of the strainer, partly in section.

The coffee-pot A may be of any suitable form, approximating to that shown in the drawing, but is preferably cylindrical or slightly tapering. The bottom $b$ is concavo-convex, so that only its outer edge will rest directly on the stove, while its central portion will be slightly above the same, and will thereby be prevented from becoming so hot as to burn any coffee which may settle on the bottom. The top $c$ tapers from the upper edge of the sides of the pot to the lower edge of the ring or band $f$, which receives the lid $e$, and extends slightly beyond the inner side of said ring or band, so as to form a flange, $d$, as shown in Fig. 1. The coffee-receptacle and strainer consists of a cylindrical case or box, G, the upper end of which is open and its edge turned outward, to form a flange, $g$, a short distance below which is a series of perforations, $h$. The removable cover or bottom consists of a perforated disk, $i$, with a surrounding ring or band, $i'$, provided with an angular slot, $k$, for engagement with a pin, $k'$, by which means it may be readily attached and held in place, and as readily removed. On the inside of the casing, at a suitable point between its ends, is a partition, $l$, of perforated sheet metal, which, with the bottom $i$, forms a chamber, $m$, in the lower part of the case G.

The ground coffee is placed in the chamber $m$; the bottom or cover $i$ $i'$ is placed in position, and secured by the engagement of the slot $k$ and pin $k'$. The case G is then inverted, and lowered into the coffee-pot A until the flange $g$ rests upon the flange $d$, so as to suspend the case G, as shown in Fig. 1. Boiling water is poured into the open upper end of the case G, so that it will pass through the ground coffee in the chamber $m$ and rise outside of the case, care being taken to prevent the water from rising above the perforations $h$ from the inside, but to cause it to pass through the ground coffee and rise outside of the case before passing through said perforations. When sufficient water has been poured in to rise, as described, to the height of the perforations, or slightly above them, the coffee-pot is allowed to remain upon the stove until the infusion is complete, the circulation of the liquid being through the coffee and the perforations $h$. The case G is then removed by the aid of a cross-bar, $n$, attached to its upper portion, leaving the liquid coffee in the pot A, ready for use.

The perforations $h$ serve the double purpose of providing for the circulation of the water, and also allowing the air to escape from the coffee-pot as the water is poured in the case G.

What I claim as new, and desire to secure by Letters Patent, is—

The combination, with a coffee-pot, of the suspended coffee-receptacle G, provided with fixed upper strainer $l$ and removable lower strainer and cap $i$ $i'$, and with circulation-orifices $h$ above the upper strainer $l$, all substantially as herein described.

NATHANIEL S. McFARLAND.

Witnesses:
MICHAEL RYAN,
BENJAMIN W. HOFFMAN.